US009016908B2

(12) United States Patent
Jin et al.

(10) Patent No.: US 9,016,908 B2
(45) Date of Patent: Apr. 28, 2015

(54) ILLUMINATION DEVICE

(75) Inventors: Joong Hun Jin, Gyeongsangnam-do (KR); Ju Saeng Kim, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 105 days.

(21) Appl. No.: 13/452,525

(22) Filed: Apr. 20, 2012

(65) Prior Publication Data

US 2012/0268956 A1 Oct. 25, 2012

(30) Foreign Application Priority Data

Apr. 21, 2011 (KR) ........................ 10-2011-0037423

(51) Int. Cl.

| | |
|---|---|
| ***B60Q 1/06*** | (2006.01) |
| ***F21V 21/26*** | (2006.01) |
| ***F21V 17/00*** | (2006.01) |
| ***F21V 21/28*** | (2006.01) |
| ***F21S 4/00*** | (2006.01) |
| ***F21V 17/02*** | (2006.01) |
| *F21V 21/30* | (2006.01) |
| *F21Y 101/02* | (2006.01) |

(52) U.S. Cl.

CPC ............... *F21V 21/26* (2013.01); *F21V 17/007* (2013.01); *F21V 21/28* (2013.01); *F21V 21/30* (2013.01); *F21S 4/006* (2013.01); *F21V 17/02* (2013.01); *F21Y 2101/02* (2013.01)

(58) Field of Classification Search

USPC ................. 362/372, 398, 418, 419, 422, 424, 362/427–430

See application file for complete search history.

(56) References Cited

U.S. PATENT DOCUMENTS

| | | | | |
|---|---|---|---|---|
| 5,422,802 | A * | 6/1995 | Lin | 362/427 |
| 6,955,442 | B1 | 10/2005 | Chan | |
| 2006/0050519 | A1 | 3/2006 | Lin | |
| 2007/0242468 | A1 | 10/2007 | Leung | |
| 2008/0253121 | A1* | 10/2008 | Chien | 362/250 |
| 2011/0254470 | A1* | 10/2011 | Penoyer | 362/235 |

FOREIGN PATENT DOCUMENTS

| | | | |
|---|---|---|---|
| DE | 20 2009 003 239 | U1 | 7/2009 |
| EP | 0 353 220 | A2 | 1/1990 |

(Continued)

OTHER PUBLICATIONS

Extended European Search Report issued in European Patent Application No. EP 12165036.0 dated May 31, 2013.

*Primary Examiner* — William Carter
(74) *Attorney, Agent, or Firm* — McDermott Will & Emery LLP

(57) ABSTRACT

Provided is an illumination device including a light emitting portion including a light source, an intermediate portion connected to the light emitting portion, a supporting portion connected to the intermediate portion and supporting the light emitting portion and the intermediate portion; a connecting portion connecting the light emitting portion and the intermediate portion to be rotatable with respect to each other, and another connecting portion connecting the intermediate portion and the supporting portion to be rotatable with respect to each other. The light emitting portion, the intermediate portion, and the supporting portion connected to the connecting portions may rotate with respect to each other based on the connecting portions to form a three-dimensional (3D) shape, and may be arranged in a single plane when the light emitting portion, the intermediate portion, and the supporting portion are unfolded based on the connecting portions.

17 Claims, 9 Drawing Sheets

(56) References Cited

FOREIGN PATENT DOCUMENTS

| | | |
|---|---|---|
| EP | 1 521 035 A1 | 4/2005 |
| JP | 2001-325805 | 11/2001 |
| KR | 10-0923646 | 10/2009 |

* cited by examiner

ILLUMINATION DEVICE

CROSS-REFERENCE TO RELATED APPLICATION

This application claims the priority benefit of Korean Patent Application No. 10-2011-0037423, filed on Apr. 21, 2011, in the Korean Intellectual Property Office, the disclosure of which is incorporated herein by reference.

BACKGROUND

1. Field

Example embodiments relate to an illumination device that satisfies the esthetic sense of users and minimizes storage space occupied by the illumination device. In particular, an illumination angle of a light source may be adjusted with respect to various areas by changing a structure of the illumination device in which a rotation angle or a height of the light source is adjustable. When the illumination device is not in use, an external structure is changed to minimize the storage space occupied by the illumination device.

2. Description of the Related Art

A stand indicates an illumination instrument that includes a light source fixed at a predetermined height from a floor among various illumination instruments, and the stand includes a movable stand, an outdoor stand, a high stand, a low stand, and the like. In the example embodiments, the stand is referred to as an illumination device.

The illumination device is used as a lighting source in a limited area, such as homes, offices, and the like, and is widely used for a precision work or for students.

Conventionally, incandescent lamps or fluorescent lamps have been used as illumination devices. Recently, a red green blue (RGB) lamp has been developed and applied to illumination devices. The RGB lamp is eco-friendly, has a long lifespan, and provides the almost same amount of light as natural light at low power consumption.

The conventional illumination device merely illuminates a limited area for a predetermined purpose, such as an eye care function, and the like and thus, may be insufficient to satisfy purchasing needs of customers that demand various functions.

Recently, research on an illumination device including a light emitting diode (LED) is being conducted. The illumination device may provide light similar to sunlight, may provide various ambiences by applying various colors of LEDs as a light source, may adjust an intensity of light, and may consume energy economically without an effect of electromagnetic waves.

The conventional illumination device may include a structure for fixing a light source at a predetermined height, and may include components for enabling rotation, and a supporting the lower portion. The support is relatively larger than objects in the upper portion so as to fix the illumination device reliably.

The conventional illumination device may need complex components to fix the light source at the predetermined height, and may need various components, such as a structure for housing an electric wire that supplies power to the light source, a structure for adjusting the height of the light source, and the like, whereby the conventional illumination device may have a complex structure and may increase in volume or size.

The conventional illumination device may need components for adjusting a rotation angle and a height of the light source, and may need a structure for connecting the components to each other and thus, the structure may be exposed to an external environment and may not satisfy the esthetic sense.

The conventional illumination device may adjust an angle when the illumination device is utilized. However, extra storage space for keeping the illumination device may be needed due to the size or the volume of the illumination device when the illumination device is not utilized.

SUMMARY

An aspect of example embodiments provides an illumination device that changes a structure to adjust an illumination angle and thus, may provide various illumination angles and may satisfy the esthetic sense.

Another aspect of example embodiments provides an illumination device that may illuminate a desired location or a desired area when the illumination device is in use, and may minimize a storage space for keeping the illumination device when the illumination device is not in use.

Still another aspect of example embodiments provides an illumination device that has a relatively simple and minimum structure, while maintaining a function of changing the structure to adjust an illumination angle and a height of the illumination device.

The foregoing and/or other aspects are achieved by providing an illumination device system, including a light emitting portion including a light source, an intermediate portion connected to the light emitting portion, a supporting portion connected to the intermediate portion and supporting the light emitting portion and the intermediate portion, and a connecting portion connecting the light emitting portion and the intermediate portion to be rotatable with respect to each other, and another connecting portion connecting the intermediate portion and the supporting portion to be rotatable with respect to each other. Here, the light emitting portion and the intermediate portion connected to the connecting portion, and the intermediate portion and the supporting portion connected to the connecting portion rotate based on the connecting portions, and the light emitting portion, the intermediate portion, and the supporting portion are arranged in a single plane when the light emitting portion, the intermediate portion, and the supporting portion are unfolded based on the connecting portions.

The connecting portion may be configured as a hinge.

The illumination device may further include a cover portion to cover an external side of the connecting portion to prevent the connecting portion from being exposed to an external environment.

The cover portion may be configured as an elastic material.

An external shape of the cover portion may include a wave shape or an uneven shape.

The light source may be configured as a surface light source having a planar shape.

The foregoing and/or other aspects are achieved by providing an illumination device, including a light emitting portion including a light source, an intermediate portion connected to the light emitting portion, a supporting portion connected to the intermediate portion, and supporting the light emitting portion and the intermediate portion, and a connecting portion connecting the light emitting portion and the intermediate portion to be rotatable with respect to each other, and another connecting portion connecting the intermediate portion and the supporting portion to be rotatable with respect to each other. Here, the intermediate portion includes a plurality of intermediate members connected by connecting portions, and the light emitting portion and the intermediate portion, the plurality of intermediate members, and the intermediate portion and the supporting portion rotate based on the connecting portions, and the light emitting portion, the intermediate portion, the plurality of intermediate members, and the supporting portion are arranged in a single plane when the light emitting portion, the intermediate portion, the plurality of intermediate member, and the supporting portion are unfolded based on the connecting portions.

When the plurality of intermediate members, the intermediate portion and the light emitting portion, and the intermediate portion and the supporting portion rotate with respect to each other, at least two rotation axes may be oblique and may form a predetermined angle.

When at least one pair of the intermediate portion and the light emitting portion, the plurality of intermediate members, and the intermediate portion and the supporting portion rotate with respect to each other and form a three-dimensional (3D) shape, the center of gravity of the illumination device may be located in a lower portion to enable the illumination device to stand and maintain the 3D shape.

The illumination device may further include a fixing portion equipped with an external object, and the supporting portion may be equipped with the fixing portion and is detachable.

The supporting portion and the fixing portion may be combined based on at least one of a forced fit scheme, a slide scheme, a combination scheme using a magnetic force, and a clamp scheme.

Additional aspects of embodiments will be set forth in part in the description which follows and, in part, will be apparent from the description, or may be learned by practice of the disclosure.

EFFECT

The example embodiments may include an illumination device that changes a structure to adjust an illumination angle and thus, may provide various illumination angles and may satisfy the esthetic sense.

The example embodiments may include an illumination device that may adjust an illumination angle based on various rotation angles of a light emitting portion and an intermediate portion connected to a connecting portion, and that may minimize a storage space for keeping the illumination device by changing a structure.

The example embodiments may include an illumination device that may occupy a minimal storage space when the illumination device is not in use, and may adjust an angle or control the center of gravity to prevent the illumination device from falling down so that a user may stably use the illumination device.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
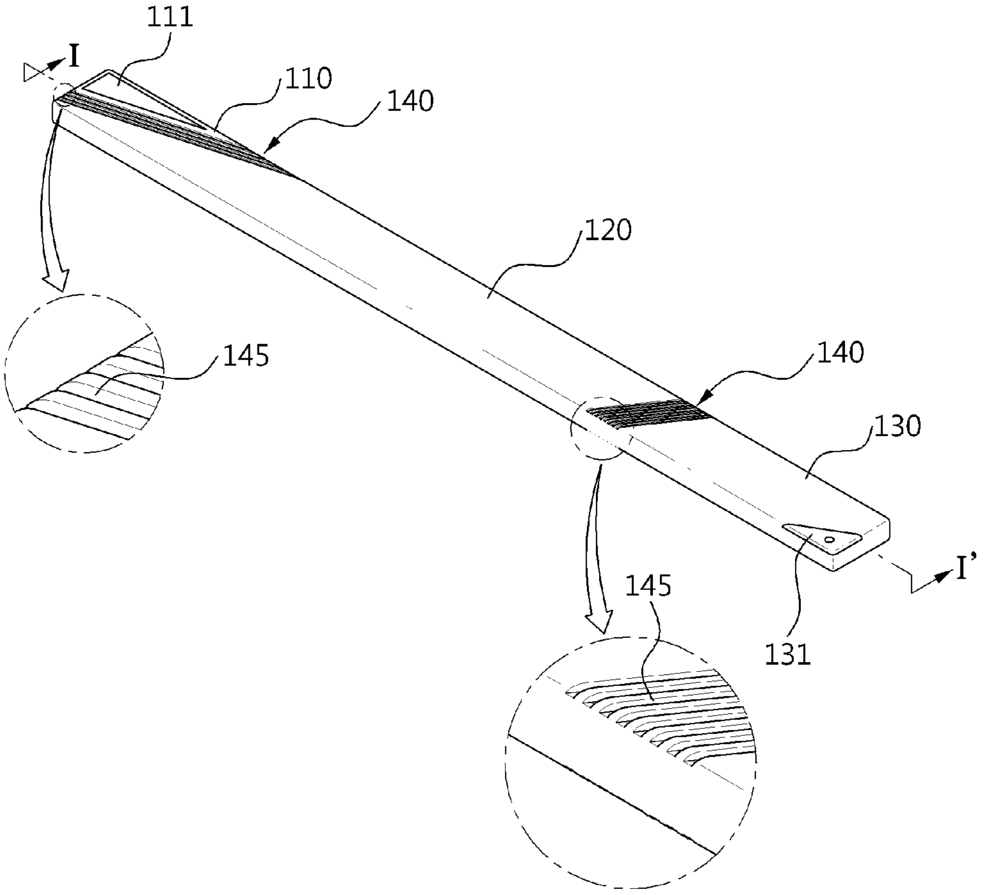
FIG. 1 is a perspective view of an illumination device according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an illumination device 100 according to example embodiments.

As illustrated in FIG. 1, the illumination device 100 includes a light emitting portion 110, an intermediate portion 120, a supporting portion 130, and connecting portions 140.

The light emitting portion 110 may include a light source 111 that emits light on one side of the light emitting portion 110. Even though the light emitting portion 110 has a triangular shape, it is not limited thereto. The light emitting portion 110 may be configured as a general light source that emits light, and may be configured as an edge-type surface light source or a thin light source, but it is not limited thereto. The light source 111 may be configured as a planar light emitting diode module corresponding to a light emitting device module that includes a light emitting device on a printed circuit board (PCB), and may be formed to have a planar triangular shape as illustrated in FIG. 1.

The intermediate portion 120 may be connected to the light emitting portion 110 to be rotatable. In this example, the intermediate portion 120 and the light emitting portion 110 may be connected by the connecting portion 140 and thus, the light emitting portion 110 rotates with respect to the intermediate portion 120.

The supporting portion 130 may be connected to the intermediate portion 120 in the same manner that the light emitting portion 110 is connected to the intermediate portion 120, to be rotatable with respect to each other. In this example, the intermediate portion 120 and the supporting portion 130 may rotate based on the connecting portion 140, and the supporting portion 130 may support the light emitting portion 110 and the intermediate portion 120.

The connecting portions 140 may connect the light emitting portion 110 and the intermediate portion 120 to be rotatable with respect to each other, and the intermediate portion 120 and the supporting portion 130 to be rotatable with respect to each other. Although the connecting portion 140 is configured as a commonly used hinge that forms a predetermined axis of rotation with respect to a rotational motion of objects connected to the connecting portion 140, it is not limited thereto.

Here, the connecting portions 140 that respectively connect the light emitting portion 110 and the intermediate portion 120, and the intermediate portion 120 and the supporting portion 130 will be described in detail with reference to FIG. 2.

Figure 2:
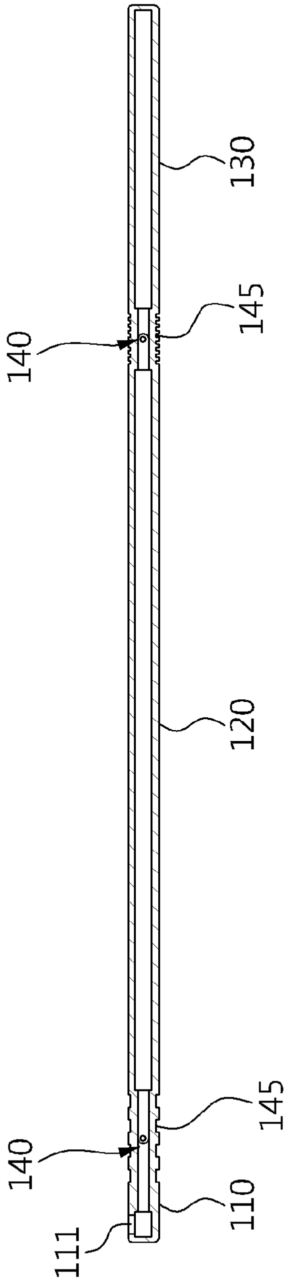
FIG. 2 is a cross-sectional view of the illumination device of FIG. 1 cut along a line I-I.

FIG. 2 is a cross-sectional view of the illumination device of FIG. 1 cut along a line I-I.

Referring to FIG. 2, the connecting portions 140 are respectively arranged between the light emitting portion 110 and the intermediate portion 120, and between the intermediate portion 120 and the supporting portion 130.

In this example, the illumination device 110 may further include a cover portion 145. The cover portion 145 may be formed to cover an external side of the connecting portion 140 so as to prevent the connecting portion 140 from being exposed to an external environment, and the connecting portions 140 may connect the light emitting portion 110, the intermediate portion 120, and the supporting portion 130 to be rotatable with respect to each other and thus, the connecting portion 140 may be configured as a modifiable material or a modifiable structure.

The connecting portion 140 may be configured as material such as a rubber having an elasticity or may be configured to include the cover portion 145 of which an external shape is a wave shape or an uneven shape (凹凸) as illustrated in FIG. 1 and thus, the connecting portion 140 may not be visually exposed to the external environment and may not interrupt rotating when at least one of the light emitting portion 110, the intermediate portion 120, and the supporting portion 130 rotates with respect to a connected counterpart portion.

Even though example embodiments describe that the cover portion 145 is equipped separately and is configured to cover the connecting portion 140 provided in a hinge shape, it is not limited thereto. The connecting portion 140 may be configured as a slightly modifiable material that maintains a rotation angle obtained when the light emitting portion 110, the intermediate portion 120, and the supporting portion 130 rotate with respect to each other due to a predetermined external force, until the external force is applied again. For example, the connecting portion 140 may be configured as a metal wire that is thick enough to support a weight of the light emitting portion 110 and to maintain the light emitting portion 110 when the light emitting portion rotates. The cover portion 145 may maintain a location of the rotated light emitting portion 110 as well as a function of covering the external side of the connecting portion 140. The cover portion 145 may be freely modified within the scope that enables the cover portion 145 to prevent the connecting portion 140 from being exposed to the external environment and to minimize an external change of the illumination device 100.

The cover portion 145 may be configured to cover an external side of the light emitting portion 110, the intermediate portion 120, and the supporting portion 130 with a coating material or a material the same as a material of the cover portion 145, so that the illumination device 100 may prevent joints from being exposed to the external environment.

Here, operations of the illumination device 100 will be described with reference to FIGS. 3A through 3C.

Figure 3A:
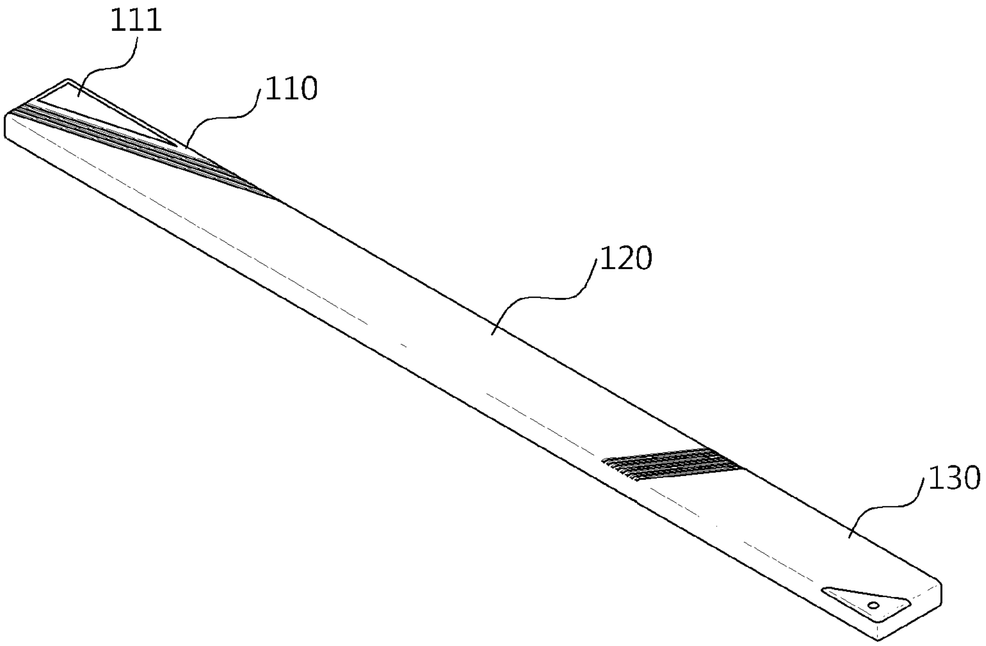
FIGS. 3A through 3C are diagrams illustrating operations of the illumination device of FIG. 1 sequentially.
Figure 3B:
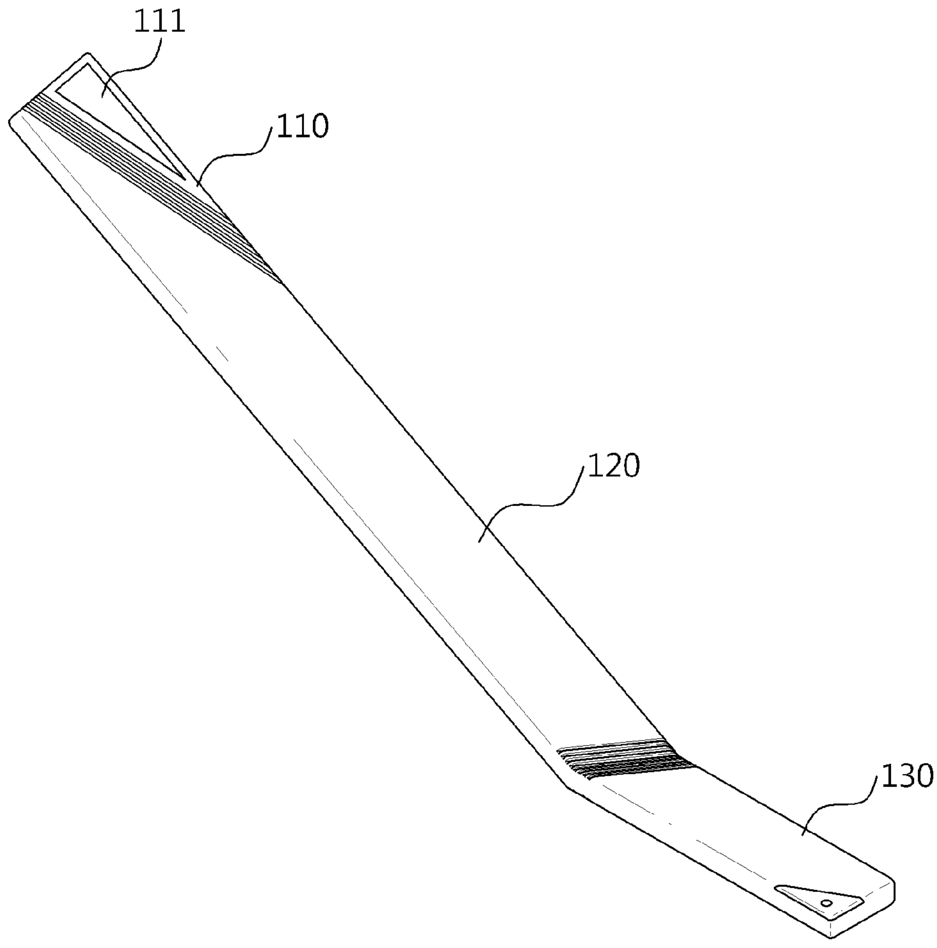
Figure 3C:
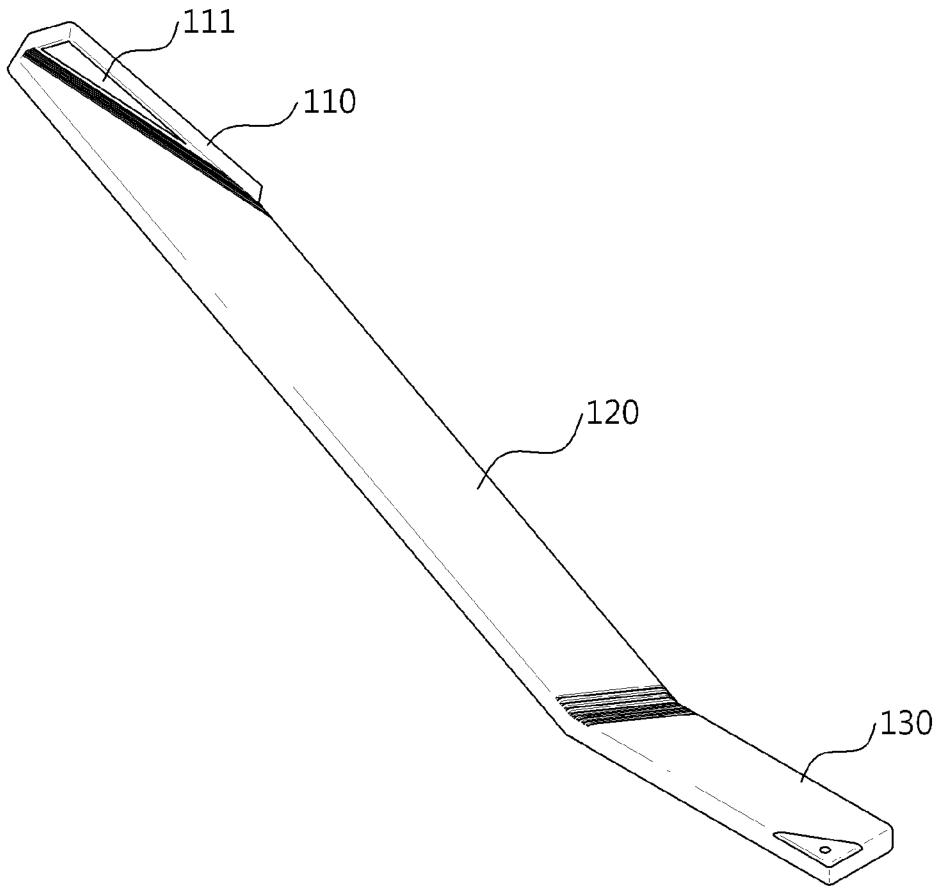

FIGS. 3A through 3C sequentially illustrate operations of the illumination device 100 of FIG. 1.

Referring to FIG. 3A, the illumination device 100 is configured to be a flat rectangular shape when the illumination device 100 is not in use. When the light emitting portion 110, the intermediate portion 120, and the supporting portion 130 do not rotate based on the connecting portions 140 and are completely spread out, the light emitting portion 110, the intermediate portion 120, and the supporting portion 130 may be arranged in a single plane.

When the illumination device 100 is not in use, the illumination device 100 may be maintained to be a rectangular parallelepiped, and the light emitting portion 110, the intermediate portion 120, and the supporting portion 130 are connected in a direction of a relatively long side of the rectangular parallelepiped of which a height is relatively thin.

Referring to FIG. 3B, the intermediate portion 120 rotates based on the connecting portion 140 connected to the supporting portion 130. Referring to FIG. 3C, the light emitting portion 110 connected to the intermediate portion 120 rotates to enable the light source 111 to emit light to a predetermined area, and power is supplied to the light source 111 to emit light and thus, the illumination device 100 becomes operational.

Even though example embodiments describe that the supporting portion 130 rotates and then the light emitting portion 110 rotates, such sequence of rotation is not limited thereto.

When the illumination device 100 is no longer in use, supplying of power is terminated, and the illuminating portion 110 and the intermediate portion 120 that rotate based on the connecting portion 140 are returned to original locations so as to restore the illumination device 100 to the planar shape as illustrated in FIG. 3A. Accordingly, the utilization of the illumination device 100 is completed.

Even though the illumination device 100 is formed to be the rectangular parallelepiped that is long in one direction and has a relatively low height when the illumination device 100 is not in use, it is not limited thereto and an external shape of the illumination device 100 may be changed in various shapes. For example, the light emitting portion 110 may be formed to be a circular shape based on a shape or a design of the light source 111 or may be formed to be a quadrangular shape overlapping the rectangular parallelepiped. The light emitting portion 110 may be freely modified within the scope that enables the light emitting portion 110, the intermediate portion 120, and the supporting portion 130 to be formed in a planar shape when the illumination device 100 is not in use.

The illumination device 100 may further include a structure for supplying power to the light source 111. In particular, the illumination device 100 may include a power supply (not illustrated) that is connected to an external common power source to provide power to the light source 111, and may further include a power switch 131 to control supplying of power.

The power switch 131 may be arranged in a corner at one end of the supporting portion 130. A location and a shape of the power switch 131 may be modified in various configurations, and the location may not limit operation of the illumination device 100.

Even though example embodiments describe that the power switch 131 is separately arranged to control supplying of power to the light source 111, it is not limited thereto. For example, power supplied to the light source 111 may be automatically discontinued when the light emitting portion 110, the intermediate portion 120, and the supporting portion 130 are completely unfolded as illustrated in FIG. 3A, and power may be supplied to the light source 111 to emit light when the light emitting portion 110 and the intermediate portion 120 completes rotation, more particularly, immediately or at a predetermined time after the light emitting portion 110 starts and completes the rotation with respect to the intermediate portion 120.

Even though example embodiments describe that the external common power is connected to the light source 111, it is not limited thereto. The illumination device 100 may include, inside the illumination device 100, a separate battery to supply power to the light source 111 and thus, the illumination device 100 may be used as a portable or movable illumination device.

When the illumination device 100 is used in a three-dimensional (3D) shape by rotating the intermediate portion 120 and the light emitting portion 110 with respect to each other, and by rotating the intermediate portion 120 and the supporting portion 130 with respect to each other, the weight of the light emitting portion 110, the intermediate portion 120, and the supporting portion 130 may be adjusted or a rotation angle of the connecting portion 140 may be limited, so that the center of gravity of the illumination device 100 is located in a lower portion of the illumination device 100.

The illumination device 100 may have, in the lower portion, a structure for supporting objects placed in an upper portion or may use materials for maintaining balance. The structure may use a material having a high density or may have a predetermined mass to enable the supporting portion 130 to have a predetermined weight, so that the supporting portion 130 supporting the light emitting portion 110 and the intermediate portion 120 may prevent the illumination device 100 from falling down by the light emitting portion 110 and the intermediate portion 120 being arranged in a relatively upper portion.

A rotation angle at the connecting portion 140 or an arranging angle for the connecting portion 140 may be adjusted by measuring a relationship between a rotation axis, which corresponds to a relative center of rotation between the light emitting portion 110 and the intermediate portion 120, and a rotation axis, which corresponds to a relative center of rotation between the intermediate portion 120 and the supporting portion 130.

The connecting portions 140 that form the rotation axes may be arranged to be inclined at a predetermined angle with respect to an axis in a longitudinal direction when the light emitting portion 110, the intermediate portion 120, and the supporting portion 130 are completely unfolded, that is, when the illumination device 100 is formed as the rectangular parallelepiped. In this example, the rotation axes may have different angles. Even though the light emitting portion 110, the intermediate portion 120, and the supporting portion 130 rotate to be unparallel with respect to the axis in the longitudinal direction of the rectangular parallelepiped, based on a shape of the connecting portion 140 to utilize the illumination device 100, it is not limited thereto. Detailed descriptions thereof will be provided with reference to FIGS. 4 and 5.

An illumination angle of the illumination device 100 may be adjusted based on various rotation angles of the light emitting portion 110 and the intermediate portion 120 connected to the connecting portion 140, and the illumination device 100 may be modified to have a minimum volume to minimize a storage space for keeping the illumination device 100 while the illumination device 100 is not in use.

Figure 4:
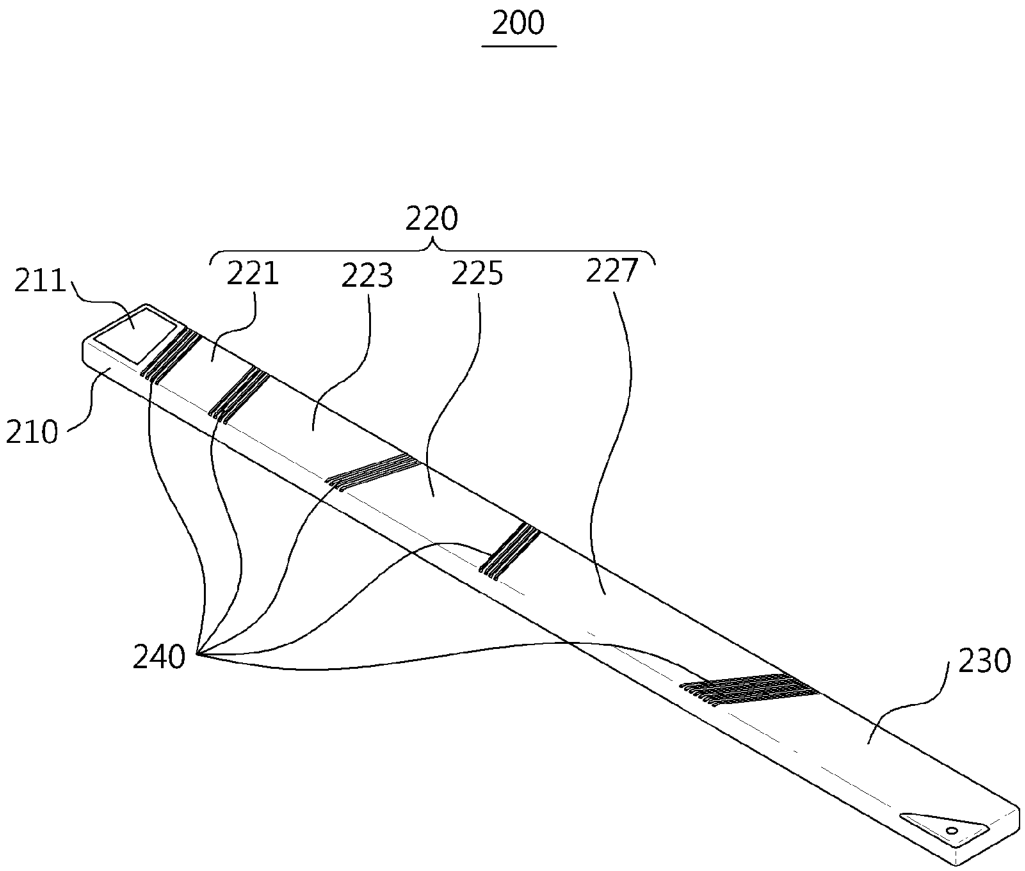
FIG. 4 is a perspective view of an illumination device according to other example embodiments.
Figure 5:
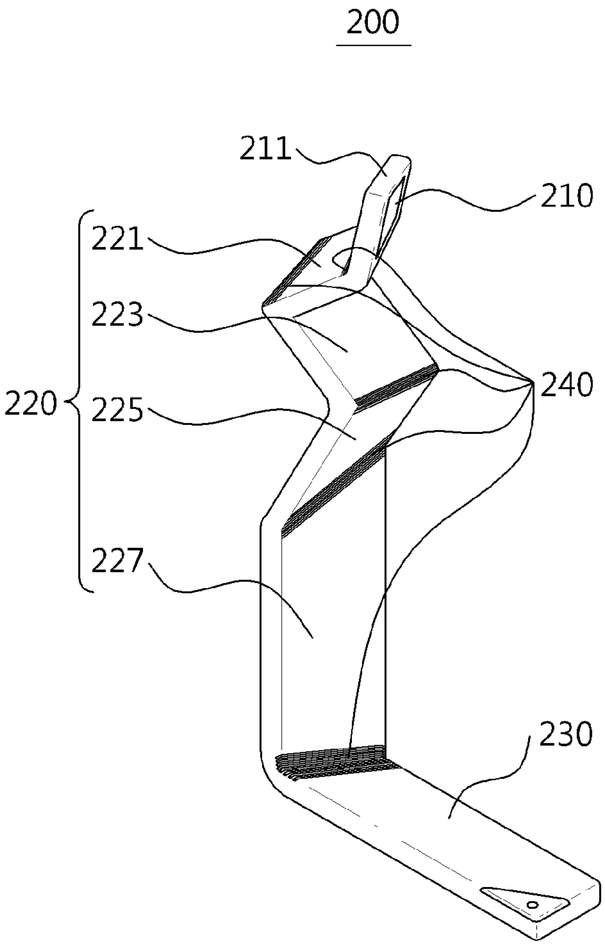
FIG. 5 is a perspective view of the illumination device of FIG. 4 when the illumination device is in use.

FIG. 4 is a perspective view of an illumination device 200 according to other example embodiments, and FIG. 5 is a perspective view of the illumination device 200 of FIG. 4 when the illumination device is in use.

Referring to FIGS. 4 and 5, the illumination device 200 includes a light emitting portion 210, an intermediate portion 220, a supporting portion 230, and connecting portions 240, similar to the illumination device 100. For ease of description, description of a structure that is similar to or the same as a structure described with reference to FIGS. 1 through 3 will be omitted.

The intermediate portion 220 may include a plurality of intermediate members 221, 223, 225, and 227. The connecting portions 240 may be respectively arranged between the light emitting portion 210 and the intermediate portion 220, among the intermediate members 221, 223, 225, and 227, and between the intermediate portion 220 and the supporting portion 230.

The plurality of intermediate members 221, 223, 225, and 227 may be connected to be rotatable with respect to each other at different angles. When the intermediate members 221, 223, 225, and 227 are connected to each other, the intermediate members 221, 223, 225, and 227 may form the single intermediate portion 220, the respective intermediate members 221, 223, 225, and 227 may be formed in different shapes, and at least two rotation axes of the intermediate members 221, 223, 225, and 227 may be unparallel. However, it is not limited thereto.

When a user uses the illumination device 200 as illustrated in FIG. 5, the user may use the illumination device 200 in a condition where the intermediate portion 220 is in a planar shape, that is, in a condition where the intermediate members 221, 223, 225, and 227 do not rotate with respect to the connecting portions 240 that connect the intermediate members 221, 223, 225, and 227.

To change an illumination area of the illumination device 200, that is, to change a rotation angle of the light emitting portion 210 with respect to the supporting portion 230, the illumination device 200 may rotate selected intermediate members, for example, the intermediate members 221, 223, 225, and 227, based on connecting portions 240 between the selected intermediate members. Accordingly, the illumination device 200 may emit light at a desired angle. The illumination device 200 may include the intermediate portion 220 that is provided in a multiple hinged joint and thus, may adjust an illumination direction to have various directions. When the illumination device 200 is not in use, the illumination device 200 may be kept as a rectangular parallelepiped and thus, may satisfy the esthetic sense of the user and may minimize a storage space for keeping the illumination device 200.

In this example, the illumination device 200 may put the center of gravity inside the supporting portion 230 or in a lower portion of the illumination device 200, to prevent the illumination device 200 from falling down.

Even though example embodiments describe that the at least two rotation axes arrange in different directions, it is not limited thereto. For example, all rotation axes may be arranged in the same direction, that is, may be arranged in parallel.

Figure 6:
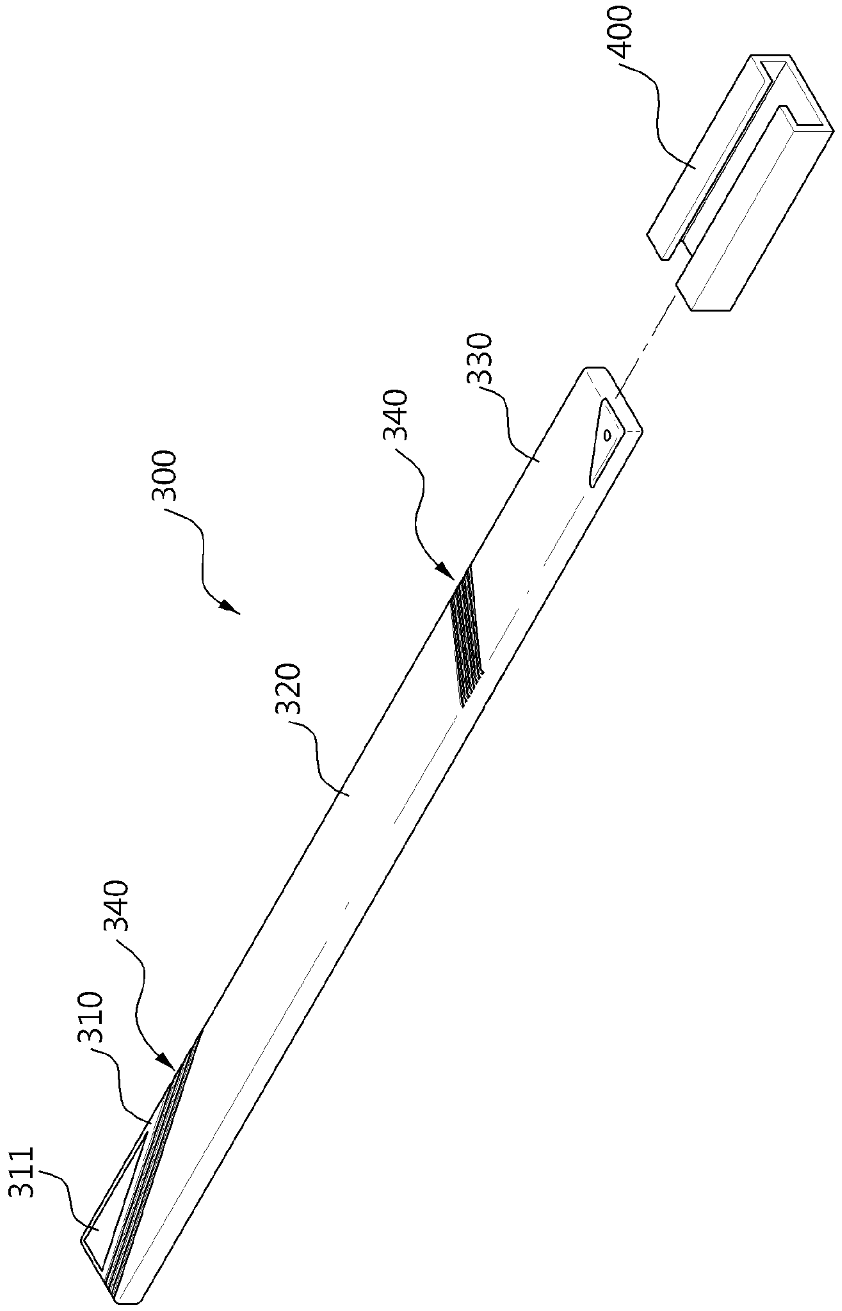
FIG. 6 is a perspective view of an illumination device according to still other example embodiments.

FIG. 6 is a perspective view of an illumination device 300 according to still other example embodiments.

Referring to FIG. 6, the illumination device 300 includes a light emitting portion 310, an intermediate portion 320, a supporting portion 330, connecting portions 340, and a fixing portion 400. For ease of descriptions, description of a structure similar to or the same as the illumination devices 100 and 200 illustrated in FIGS. 1 through 5 will be omitted.

The fixing portion 400 may be stationarily equipped with an external object, and may be used for fixing the illumination device 300.

The fixing portion 400 may be included in the supporting portion 330, and the fixing portion may be detachable. When the fixing portion 400 and the supporting portion 330 are combined, the illumination device 300 may be arranged and fixed in a predetermined location.

The supporting portion 330 and the fixing portion 400 may be combined based on a slide scheme. The fixing portion 400 may form, inside the fixing portion 400, a space for insertion that is similar to a shape of the supporting portion 330, and the supporting portion 330 is slid from one side of the fixing portion 400 to combine with the fixing portion 400 and thus, the illumination device 300 is fixed to the fixing portion 400.

In this example, even though the light emitting portion 310 and the intermediate portion 320 rotate with respect to the supporting portion 330 at various angles, the illumination device 300 may not change an illumination area of the light emitting portion 310, that is, the illumination device 300 may not fall down.

The illumination device 300 may occupy a minimum space when the illumination device 300 is not in use, and may control a location of the center of gravity to prevent the illumination device 300 from falling down and thus, the user may stably use the illumination device 300.

Even though example embodiments describe that the supporting portion 330 is included and fixed inside the fixing portion 400, it is not limited thereto. For example, unlike the structure described in the foregoing, a portion of the fixing portion 400 may be inserted to a portion of the supporting portion 330 based on a sliding-insert scheme, and be combined with the supporting portion 330. Also, the fixing portion 400 and the supporting portion 330 may be combined based on various schemes. Here, another combination scheme will be described with reference to FIG. 7.

Figure 7:
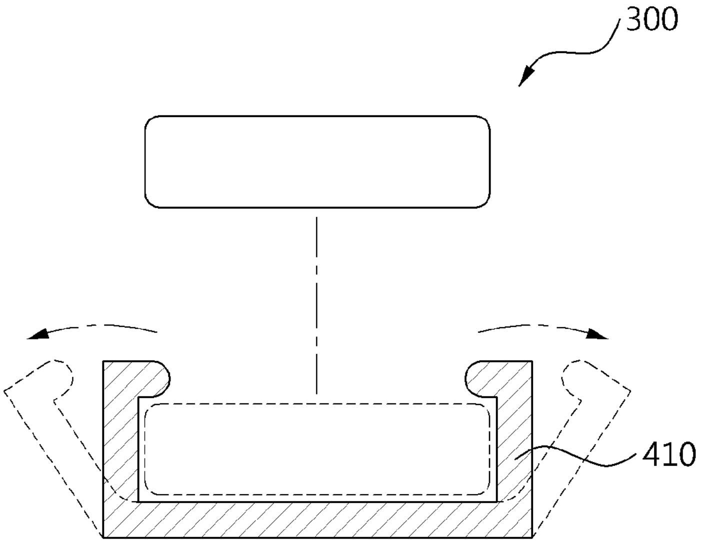
FIG. 7 is a cross-sectional view of an illumination device that is modified from the illumination device of FIG. 6.

FIG. 7 is a cross-sectional view of an illumination device that is modified from the illumination device 300 of FIG. 6.

Referring to FIG. 7, the illumination device 300 includes a modified fixing portion 410. The fixing portion 400 may form, inside the fixing portion 400, a space for including and fixing at least one portion of the supporting portion 330, and one side of the fixing portion 400 may be open. The fixing portion 400 may be configured as a material having a predetermined elasticity and thus, may be modified as illustrated with a hidden line.

A fixing scheme that fixes the supporting portion 330 using a structure of the fixing portion 410 will be briefly provided. When the supporting portion 330 is inserted to an inside of the fixing portion 410 from an upper portion of the fixing portion 410, side walls of the fixing portion 410 may be modified in an external direction as illustrated with the hidden line to secure a space for the insertion. When the fixing portion 330 is inserted to a predetermined location, the side walls return to an original location and thus, the supporting portion 330 may be fixed. The fixing scheme is referred to as a forced fit scheme.

Even though a fixing portion, for example, the fixing portions 400 and the fixing portion 410 illustrated in FIGS. 6 and 7, are combined with the supporting portion 330 based on a slide scheme or a forced fit scheme, it is not limited thereto. For example, at least one of the fixing portion and the supporting portion 330 is configured as a magnet having magnetic force and thus, the fixing portion and the supporting portion 330 may be combined using the magnetic force. Also, the fixing portion may be configured as a clamp that fixes an object using an external force and thus, the fixing portion and the supporting portion 330 may be combined based on a clamp scheme.

Even though the fixing portions 400 and 410 of FIGS. 6 and 7 are used for fixing the illumination device 300, it is not limited thereto.

For example, when the fixing portion 400 includes a power terminal (not illustrated) for supplying an external common power to the illumination device 300 and the supporting portion 330 includes a contact terminal (not illustrated) for receiving an external power by contact with the power terminal, and the power terminal is in contact with the contact terminal, power may be supplied to the light source 311 or a battery-type source may be charged.

When the power terminal and the contact terminal are included, a structure for safety may be needed. Only when the power terminal and the contact terminal satisfy a predetermined condition, that is, when the supporting portion 330 is inserted and fixed to the fixing portion or when the supporting portion 330 is inserted, by a predetermined length or depth, to the fixing portion, the power terminal and the contact terminal may be exposed to an external environment or power may be supplied. Accordingly, the structure may prevent accidents, such as a fire caused by a short circuit or loose contact due to a foreign substance.

Even though example embodiments describe that a portion of the supporting portion 330 is fixed to the fixing portion, the light emitting portion 310 and a portion or whole of the intermediate portion 320 may be inserted to the fixing portion and may be taken out of the fixing portion.

The illumination device 300 may be modified to a structure having a minimum size or a structure that provides convenience for storage and thus, the illumination device 300 may minimize a storage space for keeping the device and may satisfy the esthetic sense.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An illumination device, comprising:

a light emitting portion including a light source;

an intermediate portion connected to the light emitting portion;

a supporting portion connected to the intermediate portion and supporting the light emitting portion and the intermediate portion; and a connecting portion including a first connecting portion and a second connecting portion, the first connecting portion connecting the light emitting portion and the intermediate portion such that the light emitting portion and the intermediate portion are rotatable with respect to each other around a first axis extending in a first direction, and the second connecting portion connecting the intermediate portion and the supporting portion such that the intermediate portion and the supporting portion are rotatable with respect to each other around a second axis extending in a second direction that is nonparallel with the first direction, wherein the light emitting portion and the intermediate portion connected to the first connecting portion, and the intermediate portion and the supporting portion connected to the second connecting portion, rotate based on the first and second connecting portions, wherein the light emitting portion, the intermediate portion, and the supporting portion are arranged in a single plane when the light emitting portion, the intermediate portion, and the supporting portion are unfolded based on the first and second connecting portions, wherein a center of gravity of the illumination device is located in a lower portion of the illumination device to enable the illumination device to stand, and wherein a rotation angle at the connecting portion is adjusted based on a measurement of a relationship between the first axis, which corresponds to an axis of rotation between the light emitting portion and the intermediate portion, and the second axis, which corresponds to an axis of rotation between the intermediate portion and the supporting portion.

2. The illumination device of claim 1, wherein the connecting portion is configured as a hinge.

3. The illumination device of claim 1, further comprising:

a cover portion to cover an external side of the connecting portion to prevent the connecting portion from being exposed to an external environment.

4. The illumination device of claim 3, wherein the cover portion is configured as an elastic material.

5. The illumination device of claim 3, wherein an external shape of the cover portion includes a wave shape or an uneven shape.

6. The illumination device of claim 1, wherein the light source is configured as a surface light source having a planar shape.

7. The illumination device of claim 1, wherein the center of gravity of the illumination device is located in the supporting portion to enable the illumination device to stand.

8. An illumination device, comprising:

a light emitting portion including a light source;

an intermediate portion connected to the light emitting portion;

a supporting portion connected to the intermediate portion, and supporting the light emitting portion and the intermediate portion; and a connecting portion including a first connecting portion and a second connecting portion, the first connecting portion connecting the light emitting portion and the intermediate portion such that the light emitting portion and the intermediate portion are rotatable with respect to each other around a first axis extending in a first direction, and the second connecting portion connecting the intermediate portion and the supporting portion such that the intermediate portion and the supporting portion are rotatable with respect to each other around a second axis extending in a second direction that is nonparallel with the first direction, wherein the intermediate portion includes a plurality of intermediate members connected by connecting portions, and the light emitting portion and the intermediate portion, the plurality of intermediate members, and the intermediate portion and the supporting portion rotate based on the connecting portions, and the light emitting portion, the intermediate portion, the plurality of intermediate members, and the supporting portion are arranged in a single plane when the light emitting portion, the intermediate portion, the plurality of intermediate member, and the supporting portion are unfolded based on the connecting portions, wherein when at least one pair of the intermediate portion and the light emitting portion, the plurality of intermediate members, and the intermediate portion and the and the supporting portion rotates with respect to each other and forms a three-dimensional (3D) shape, a center of gravity of the illumination device is located in a lower portion to enable the illumination device to stand and maintain the 3D shape, and wherein a rotation angle at the connecting portion is adjusted based on a measurement of a Relationship between the first axis, which corresponds to an axis of rotation between the light emitting portion and the intermediate portion, and the second axis, which corresponds to an axis of rotation between the intermediate portion and the supporting portion.

9. The illumination device of claim 8, wherein, when the plurality of intermediate members, the intermediate portion and the light emitting portion, and the intermediate portion and the supporting portion rotate with respect to each other, at least two rotation axes are oblique and form a predetermined angle.

10. The illumination device of claim 8, further comprising:

a fixing portion equipped with an external object, wherein the supporting portion is equipped with the fixing portion and is detachable.

11. The illumination device of claim 8, wherein the supporting portion and the fixing portion are combined based on at least one of a forced fit scheme, a slide scheme, a combination scheme using a magnetic force, and a clamp scheme.

12. The illumination device of claim 8, wherein the center of gravity of the illumination device is located in the supporting portion to enable the illumination device to stand.

13. An illumination device system, comprising:

a light emitting portion including a light source;

an intermediate portion connected to the light emitting portion;

a supporting portion connected to the intermediate portion and supporting the light emitting portion and the intermediate portion; and a connecting portion formed of an elastic material and including a first connecting portion and a second connecting portion, the first connecting portion connecting the light emitting portion and the intermediate portion and being foldable based on a first axis extending in a first direction, and the second connecting portion connecting the intermediate portion and the supporting portion and being foldable based on a second axis extending in a second direction that is different from the first direction, wherein:

a shape of the first connecting portion is changed when the light emitting portion and the intermediate portion are folded, and a shape of the second connecting portion is changed when the intermediate portion and the supporting portion are folded, and each of the first connecting portion and the second connecting portion has their original shapes when the first connecting portion and the second portion are unfolded based on the first axis and the second axis, a center of gravity of the illumination device system is located in a lower portion of the illumination device system to enable the illumination device system to stand, and a rotation angle at the connecting portion is adjusted based on a measurement of a relationship between the first axis, which corresponds to an axis of rotation between the light emitting portion and the intermediate portion, and the second axis, which corresponds to an axis of rotation between the intermediate portion and the supporting portion.

14. The illumination device system of claim 13, wherein, the light emitting portion, the intermediate portion, and the supporting portion are arranged in a straight line.

15. The illumination device system of claim 13, wherein the first direction is nonparallel with the second direction.

16. The illumination device system of claim 13, wherein the light emitting portion and the intermediate portion connected to the first connecting portion, and the intermediate portion and the supporting portion connected to the second connecting portion, rotate based on the connecting portions.

17. The illumination device system of claim 13, wherein the center of gravity of the illumination device system is located in the supporting portion to enable the illumination device to stand.

* * * * *